(12) United States Patent
Wang et al.

(10) Patent No.: US 12,512,592 B2
(45) Date of Patent: Dec. 30, 2025

(54) ANTENNA AND ANTENNA SYSTEM

(71) Applicants: Beijing BOE Technology Development Co., Ltd., Beijing (CN); BOE Technology Group Co., Ltd., Beijing (CN)

(72) Inventors: Feng Wang, Beijing (CN); Jian Zhou, Beijing (CN); Yafei Zhang, Beijing (CN); Feng Qu, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 193 days.

(21) Appl. No.: 18/273,787

(22) PCT Filed: Jul. 1, 2022

(86) PCT No.: PCT/CN2022/103255
§ 371 (c)(1),
(2) Date: Jul. 24, 2023

(87) PCT Pub. No.: WO2023/000951
PCT Pub. Date: Jan. 26, 2023

(65) Prior Publication Data
US 2024/0079783 A1    Mar. 7, 2024

(30) Foreign Application Priority Data

Jul. 20, 2021 (CN) .......................... 202110817204.4

(51) Int. Cl.
*H01Q 9/04*   (2006.01)
*H04B 1/40*   (2015.01)

(52) U.S. Cl.
CPC ............. *H01Q 9/0407* (2013.01); *H04B 1/40* (2013.01)

(58) Field of Classification Search
CPC ........ H01Q 9/0407; H01Q 1/243; H01Q 1/38; H01Q 1/36; H01Q 1/50; H01Q 9/04;
(Continued)

(56) References Cited

U.S. PATENT DOCUMENTS

| 9,548,787 B1 * | 1/2017 | Lee .......................... H04B 1/48 |
| 10,020,579 B1 * | 7/2018 | Zheng .................. H04B 1/3833 |

(Continued)

FOREIGN PATENT DOCUMENTS

| CN | 1154579 A | 7/1997 |
| CN | 103730725 A | 4/2014 |

(Continued)

OTHER PUBLICATIONS

International Search Report for PCT/CN2022/103255 Mailed Sep. 22, 2022.
(Continued)

*Primary Examiner* — Lana N Le
(74) *Attorney, Agent, or Firm* — Ling Wu; Stephen Yang; Ling and Yang Intellectual Property

(57) ABSTRACT

An antenna and an antenna system. The antenna includes: a first dielectric layer (1) having a first surface and a second surface, which are arranged opposite each other in a thickness direction thereof; a radiation patch (2), which is arranged on the first surface of the first dielectric layer; and a first electrode layer (3), which is arranged on the second surface of the first dielectric layer, and at least partially overlaps with the orthographic projection of the radiation patch on the second surface, wherein the first electrode layer has inner recesses (31, 32), and openings of the inner recesses face the radiation patch. The orthographic projection of at least part of a radiation edge of the radiation patch (Continued)

on the first dielectric layer at least partially overlaps with the orthographic projections of the inner recesses on the first surface.

15 Claims, 7 Drawing Sheets

(58) Field of Classification Search
 CPC ............ H01Q 1/241; H01Q 1/24; H01Q 1/40;
  H01Q 13/10; H01Q 19/005; H01Q 9/40;
  H01Q 9/42; H01Q 1/422; H01Q 7/00;
  H04B 1/40; H04B 7/0413; H04B 1/04;
  H04B 1/48; H04B 2001/0408; H04B
  1/0458; H04B 1/0053; H04B 1/3827;
  H04B 1/38; H04B 1/3833; H04B 5/43;
  H04B 1/18; H04B 5/20; H04B 7/0897
 See application file for complete search history.

(56) References Cited

U.S. PATENT DOCUMENTS

| | | | |
|---|---|---|---|
| 2005/0168383 A1 | 8/2005 | Lee | |
| 2009/0051620 A1 | 2/2009 | Ishibashi et al. | |
| 2011/0012808 A1 | 1/2011 | Tatarnikov et al. | |
| 2014/0292606 A1 | 10/2014 | Hayakawa et al. | |
| 2016/0328057 A1* | 11/2016 | Chai | H01Q 1/243 |
| 2017/0374182 A1* | 12/2017 | Lee | H04B 1/3833 |
| 2020/0006855 A1* | 1/2020 | Tabata | H01Q 9/04 |
| 2020/0243969 A1* | 7/2020 | Fang | H01Q 3/36 |
| 2022/0302578 A1 | 9/2022 | Liu et al. | |

FOREIGN PATENT DOCUMENTS

| | | |
|---|---|---|
| CN | 104009292 A | 8/2014 |
| CN | 106785463 | 5/2017 |
| CN | 109119757 A | 1/2019 |
| CN | 109768380 A | 5/2019 |
| CN | 110534872 A | 12/2019 |
| CN | 210984953 U | 7/2020 |
| CN | 217134663 U | 8/2022 |
| JP | 2001053534 A | 2/2001 |
| JP | 2009065321 A | 3/2009 |
| JP | 2010114645 A | 5/2010 |
| JP | 2018148351 A | 9/2018 |

OTHER PUBLICATIONS

Notice of First Correction dated Nov. 24, 2021 for Chinese Patent Application No. 202121646414.3 and English Translation.
Notice of Second Correction dated Feb. 14, 2022 for Chinese Patent Application No. 202121646414.3 and English Translation.
Chao Sun, A Design of Low Profile Microstrip Patch Antenna With Bandwidth Enhancement, IEEE Access, vol. 8, 2020, pp. 181988-181997.
Chen Ding et al., An Optically Transparent Dual-Polarized Stacked Patch Antenna With Metal-Mesh Films, 1536-1225 (c) 2019 IEEE.
Deng et al., Low-profile circularly polarised patch-ring antenna with compact feeding network, IET Microw. Antennas Propag., 2018, vol. 12 Iss. 3, pp. 410-415.
Office Action dated Oct. 31, 2025 for CN 202110817204.4 and English Translation.
Lu Xiao-peng et al., "Microstrip Line Fed Wideband Single-Layer Patch Antenna", Radar Science and Technology, vol. 10, No. 4, Aug. 2012, pp. 448-452.
M. Fallah-Rad et al., "Ground Plane PBGs and their Effects on the Performance of Microstrip Patch Antennas", 2002 9th International Symposium on Antenna Technology and Applied Electromagnetics, Mar. 2, 2017.

* cited by examiner

ANTENNA AND ANTENNA SYSTEM

CROSS-REFERENCE TO RELATED APPLICATIONS

This application is a continuation of International PCT Application No. PCT/CN2022/103255 filed on Jul. 1, 2022, which claims the priority to Chinese Patent Application No. 202110817204.4 filed on Jul. 20, 2021, which are hereby incorporated herein by reference in their entireties.

TECHNICAL FIELD

The disclosure belongs to the technical field of communication, in particular to an antenna and an antenna system.

BACKGROUND

In mobile terminals such as mobile phones, notebook computers and tablet computers, as well as wireless applications such as microsatellites, smart windows and smart wearable devices, miniaturization and thin film antenna has become a development trend. Thin film antenna is helpful to realize conformal structure design and reduce the weight of antenna. Herein, one of the important aspects of thin film antenna is to reduce the profile height of antenna. Therefore, how to reduce the profile height of antenna is an urgent technical problem to be solved.

SUMMARY

The invention aims at solving at least one of the technical problems existing in the prior art, and provides an antenna and an antenna system.

Embodiments of the present disclosure provide an antenna including:
- a first dielectric layer having a first surface and a second surface arranged opposite to each other in a thickness direction thereof;
- a radiation patch, which is arranged on the first surface of the first dielectric layer;
- a first electrode layer, which is arranged on the second surface of the first dielectric layer, and at least partially overlaps with the orthographic projection of the radiation patch on the second surface; wherein
- the first electrode layer has an inner recess, and openings of the inner recess face the radiation patch, and the orthographic projection of at least part of a radiation edge of the radiation patch on the first dielectric layer at least partially overlaps with the orthographic projection of the inner recess on the first surface; the depth of the inner recess is ¼ equivalent wavelength.

Herein, the radiation edge of the radiation patch includes a first radiation edge and a second radiation edge extending in a first direction and arranged side by side in a second direction; the inner recess includes a first inner recess and a second inner recess; the length direction of both the first inner recess and the second inner recess is the first direction, the width direction of both the first inner recess and the second inner recess is the second direction, and the depth direction of both the first inner recess and the second inner recess is the thickness direction of the first electrode layer; the orthographic projection of the first radiation edge on the first dielectric layer is located in the orthographic projection of the first inner recess on the first dielectric layer; the orthographic projection of the second radiation edge on the first dielectric layer is located in the orthographic projection of the second inner recess on the first dielectric layer.

Herein, the radiation edge of the radiation patch further includes a third radiation edge and a fourth radiation edge extending along the second direction and arranged side by side along the first direction; the inner recess further includes a third inner recess and a fourth inner recess; the length direction of the third inner recess and the fourth inner recess is the second direction, the width direction of the third inner recess and the fourth inner recess is the first direction, and the depth direction of the third inner recess and the fourth inner recess is the thickness direction of the first electrode layer; the orthographic projection of the third radiation edge on the first dielectric layer is located in the orthographic projection of the third inner recess on the first dielectric layer; the orthographic projection of the fourth radiation edge on the first dielectric layer is located in the orthographic projection of the fourth inner recess on the first dielectric layer.

Herein, the first inner recess, the second inner recess, the third inner recess and the fourth inner recess are sequentially connected end to end to form a closed-loop inner recess.

Herein, the first inner recess, the second inner recess, the third inner recess, and the fourth inner recess are sequentially connected to form an open-loop inner recess.

Herein, the antenna further includes: a feedline arranged on the first surface of the dielectric layer, the feedline is electrically connected with the radiation patch; the orthographic projection of the feedline on the first dielectric layer and the orthographic projection of the open-loop inner recess on the first dielectric layer do not overlap.

Herein, the radiation edge of the radiation patch includes a first radiation edge and a second radiation edge extending in a first direction and arranged side by side in a second direction; the inner recess includes a first inner recess and a second inner recess.

The first inner recess includes a first main body part and a first branch part, the first main body part and the first branch part communicate with each other, and the depth direction of the first branch part is the thickness direction of the first electrode layer, and the depth direction of the first main body part is the second direction; the orthographic projection of the first radiation edge on the first dielectric layer is located in the orthographic projection of the first main body part on the first dielectric layer.

The second inner recess includes a second main body part and a second branch part, the second main body part and the second branch part communicate with each other, and the depth direction of the second branch part is the thickness direction of the first electrode layer, and the depth direction of the second main body part is the second direction; the orthographic projection of the second radiation edge on the first dielectric layer is located in the orthographic projection of the second main body part on the first dielectric layer.

Herein, the first inner recess includes two of the first branch parts and the first main body part includes two first sub-main body parts; two of the first branch parts are arranged side by side along the first direction; the depth directions of the two first sub-main body parts are both in the first direction, and both are arranged side by side along the first direction, and the orthographic projection of the first radiation edge on the first dielectric layer is located in the orthographic projection of the two first sub-main body parts on the first dielectric layer.

The second inner recess includes two of the second branch parts, and the second main body part includes two second sub-main body parts; two of the second branch parts are arranged side by side along the first direction; the depth directions of the two second sub-main body parts are both in the first direction, and they are arranged side by side along the first direction; the orthographic projection of the second radiation edge on the first dielectric layer is located in the orthographic projection of the two second sub-main body parts on the first dielectric layer.

Herein, the antenna further includes:
a second dielectric layer, wherein a blind groove is arranged on the second dielectric layer; the first electrode layer is arranged on the second dielectric layer, and the blind groove defines the inner recess.

Herein, the second dielectric layer has an intermediate region and a peripheral region surrounding the intermediate region; the blind groove penetrates at least part of a boundary line between the intermediate region and the peripheral region; the orthographic projection of the radiation patch on the first surface covers the orthographic projection of the intermediate region of the reference electrode on the first surface.

The first electrode layer includes a first hollow pattern located in the intermediate region and a second hollow pattern located in the peripheral region; the radiation patch includes a third hollow pattern.

Herein, the orthographic projections of the hollow portion of the first hollow pattern and the hollow portion of the third hollow portion on the first surface completely overlap.

Herein, the bottom angle of the blind groove is between 80° to 100°.

Herein, the dielectric material filled in the inner recess includes any one of silicon, aluminum oxide, and ceramic.

In a second aspect, the embodiments of the present disclosure provide an antenna system including at least one above-mentioned antenna.

The antenna system further includes:
a transceiver unit used for transmitting or receiving signals;
a radio frequency transceiver, connected with the transceiver unit, used for modulating the signal sent by the transceiver unit or for demodulating the signal received by the antenna and transmitting it to the transceiver unit;
a signal amplifier connected with the radio frequency transceiver and used for improving the signal-to-noise ratio of the signal output by the radio frequency transceiver or the signal received by the antenna;
a power amplifier connected with the radio frequency transceiver and used for amplifying the power of the signal output by the radio frequency transceiver or the signal received by the antenna;
a filter unit, which is connected with the signal amplifier, the power amplifier and the antenna, and is used for filtering the received signal and sending it to the antenna, or filtering the signal received by the antenna.

DETAILED DESCRIPTION

To enable those skilled in the art to better understand the technical solutions of the present invention, a further detailed description of the present invention is given below in conjunction with the accompanying drawings and detailed description.

Unless otherwise defined, technical terms or scientific terms used in the present disclosure should have the meanings as commonly understood by those of ordinary skill in the art that the present disclosure belongs to. The "first", "second" and similar terms used in the present disclosure do not indicate any order, number, or importance, but are used only for distinguishing different components. Similarly, similar words such as "a", "an" or "the" do not denote a limitation on quantity, but rather denote the presence of at least one. "Include", "contain", or similar words mean that elements or objects appearing before the words cover elements or objects listed after the words and their equivalents, but do not exclude other elements or objects. "Connect", "join", or a similar term is not limited to a physical or mechanical connection, but may include an electrical connection, whether direct or indirect. "Upper", "lower", "left", "right", etc., are used to represent relative positional relations, and when an absolute position of a described object is changed, the relative positional relation may also be correspondingly changed.

Figure 1:
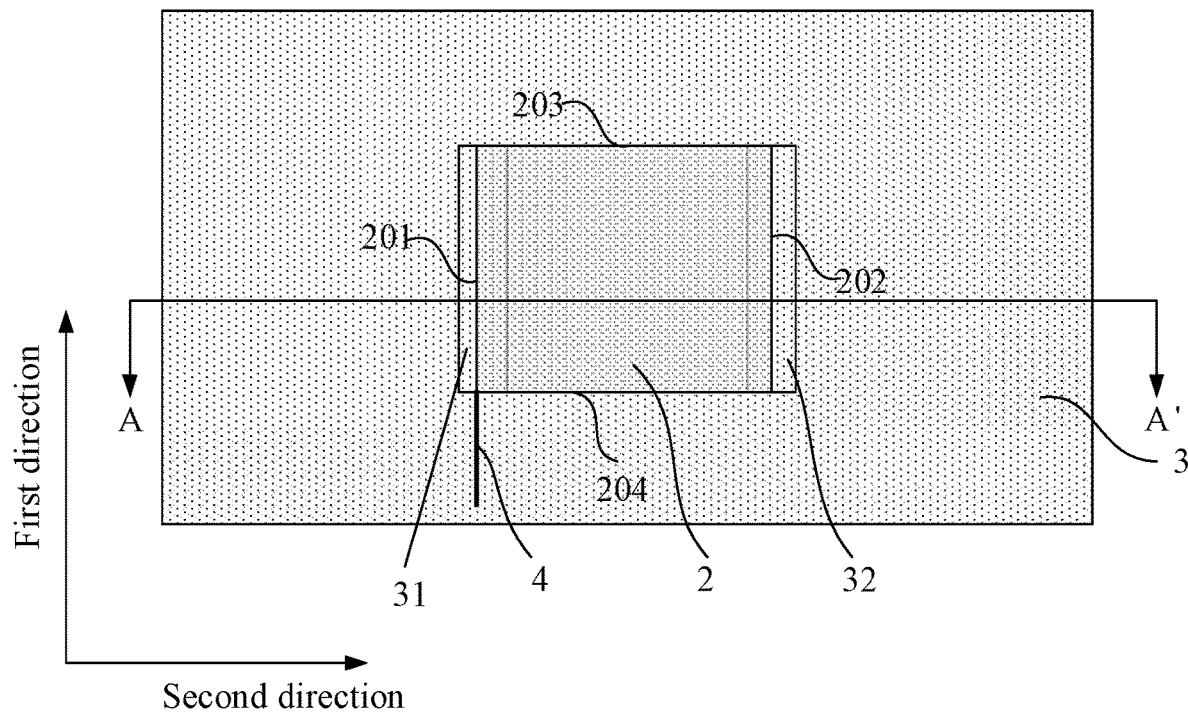
FIG. 1 is a schematic diagram of a structure of an antenna according to an embodiment of the present disclosure.
Figure 2:
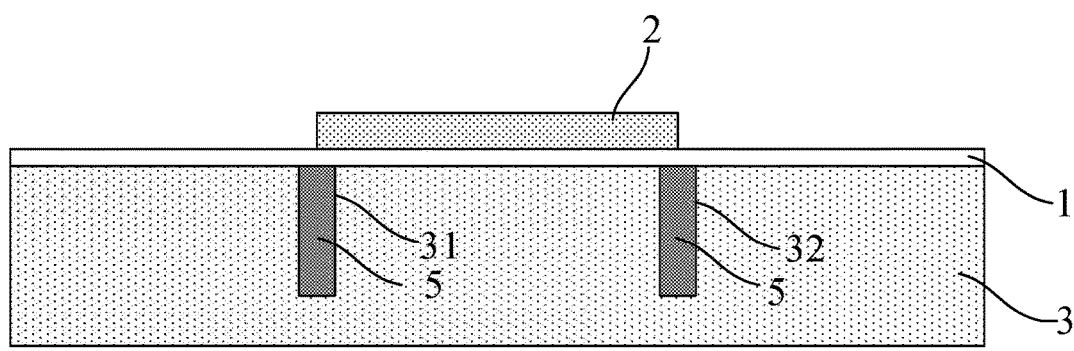
FIG. 2 is a cross-sectional view along A-A' in the antenna of FIG. 1.

In a first aspect, FIG. 1 is a schematic diagram of a structure of an antenna according to an embodiment of the present disclosure; FIG. 2 is a cross-sectional view along A-A' in the antenna of FIG. 1; embodiments of the present disclosure provide an antenna including a first dielectric layer 1, a radiation patch 2, a first electrode layer and a feedline 4. Herein, the first dielectric layer 1 includes a first surface and a second surface arranged opposite each other in a thickness direction thereof. The radiation patch 2 and the feedline 4 are arranged on the first surface of the first dielectric layer 1, and the feedline 4 is electrically connected with the radiation patch 2. The first electrode layer has an inner recess, the first electrode layer is arranged on the second surface of the first dielectric layer 1, and openings of the inner recess on the first electrode layer face the first dielectric layer 1. The orthographic projection of the radiation patch 2 on the first dielectric layer 1 at least partially overlaps with the orthographic projection of the first electrode layer on the first dielectric layer 1, and the orthographic projection of at least part of the radiation edge of the radiation patch 2 on the first dielectric layer 1 at least partially overlaps with the orthographic projection of the inner recess on the first surface; the depth of the inner recess is ¼ equivalent wavelength; the equivalent wavelength is the vacuum wavelength divided by the refractive index of the dielectric material in the inner recess.

It should be noted that in the embodiment of the present disclosure, the first electrode layer includes, but is not limited to, the ground plane 3, that is, the signal applied to the first electrode layer is a ground signal. In the embodiment of the present disclosure, the description is made by taking the first electrode layer as the ground plane 3 as an example. It should be understood that as long as the actual voltage on the first electrode layer and the radiation layer can form a loop when the thin film antenna works, that is, the selection of the ground plane 3 for the first electrode layer does not limit the protection scope of the embodiment of the present disclosure. In addition, in the embodiment of the present disclosure, the radiation edge of the radiation patch 2 refers to the side edge of the radiation patch 2. For example, when the contour of the radiation patch 2 is rectangular, four side edges of the rectangular radiation patch 2 are radiation edges.

The antenna according to the embodiment of the present disclosure has an inner recess on the ground plane 3, and the orthographic projection of at least part of the radiation edge of the radiation patch 2 on the first dielectric layer 1 is located in the orthographic projection of the inner recess on the first dielectric layer 1. By setting this kind of inner recess, the distance between the radiation patch 2 and the ground plane 3 can be shortened, while maintaining a bandwidth of over 6%, and increasing the maximum radiation efficiency of the resonant frequency point to 40%-70%. That is, the antenna according to the embodiment of the present disclosure can reduce the thickness of the first dielectric layer 1 and the overall profile height of the antenna, and improve the radiation efficiency of the antenna.

In some examples, the inner recess of the first electrode layer may be filled with a filling medium 5, which is a corresponding high dielectric constant material in the microwave millimeter band, such as silicon, aluminum oxide, a specific ceramic material, and the like. In the inner recess, if the high dielectric constant material is not filled, the radiation efficiency can be increased by 4 to 5 times compared with the traditional low-profile patch antenna, while after filling the high dielectric constant material, the maximum radiation efficiency can be increased to about 6 to 8 times, and the radiation bandwidth (with 30% radiation efficiency) will also be increased to more than 15%.

In some examples, the materials of the radiation patch 2, the feedline 4 and the ground plane 3 may all be the same. For example, it may be at least one of copper (Cu), aluminum (Al), molybdenum (Mo), and silver (Ag). In the embodiment of the present disclosure, the description is made by taking a case in which copper is used as the materials of the radiation patch 22, the feedline 44 and the ground plane 33 as an example.

In some examples, as shown in FIG. 2, the first dielectric layer 1 in the antenna may be a single-layer structure or a composite layer structure, and when the dielectric layer 1 adopts a single-layer structure, its material includes, but is not limited to, flexible material, for example, the first dielectric layer 1 adopts polyimide (PI) or polyethylene terephthalate (PET) material.

Figure 3:
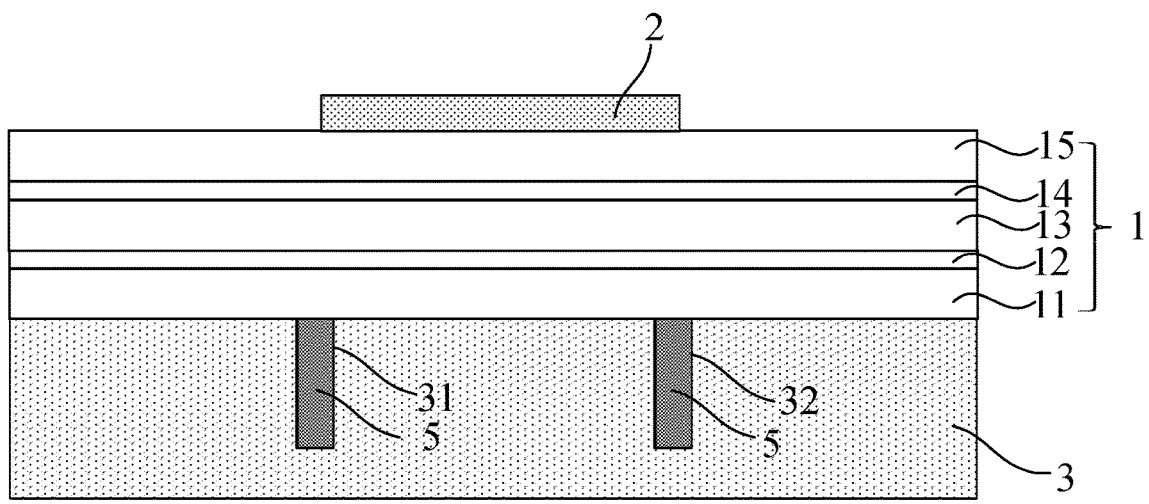
FIG. 3 is another cross-sectional view along A-A' in the antenna of FIG. 1.

In some examples, FIG. 3 is another cross-sectional view along A-A' in the antenna of FIG. 1; as shown in FIG. 3, when the first dielectric layer 1 is a composite film layer, it includes a first sub-dielectric layer 11, a first adhesive layer 12, a second sub-dielectric layer 13, a second adhesive layer 14 and a third sub-dielectric layer 15 which are stacked sequentially; herein, the ground plane 33 is arranged on the side of the first sub-dielectric layer 11 departing from the first adhesive layer 12, that is, the side of the first sub-dielectric layer 11 departing from the first adhesive layer 12 is used as the second surface of the dielectric layer 1; the radiation patch 22 is arranged on the side of the third sub-dielectric layer 15 departing from the second adhesive layer 14, that is, the side of the second sub-dielectric layer 13 departing from the second adhesive layer 14 is used as the first surface of the dielectric layer 1. The first sub-dielectric layer 11 and the third sub-dielectric layer 15 include, but are not limited to, PI material; the second sub-dielectric layer 13 includes, but is not limited to, polyethylene terephthalate (PET) material. The material of the first adhesive layer 12 and the second adhesive layer 14 may be a transparent optical (OCA) adhesive. When the radiation patch 22 is arranged between the third sub-dielectric layer 15 and the second adhesive layer 14, a protective layer, such as a self-repairing transparent waterproof coating, is also formed on the upper surface of the third sub-dielectric layer 15 to protect the third sub-dielectric layer 15.

Figure 4:
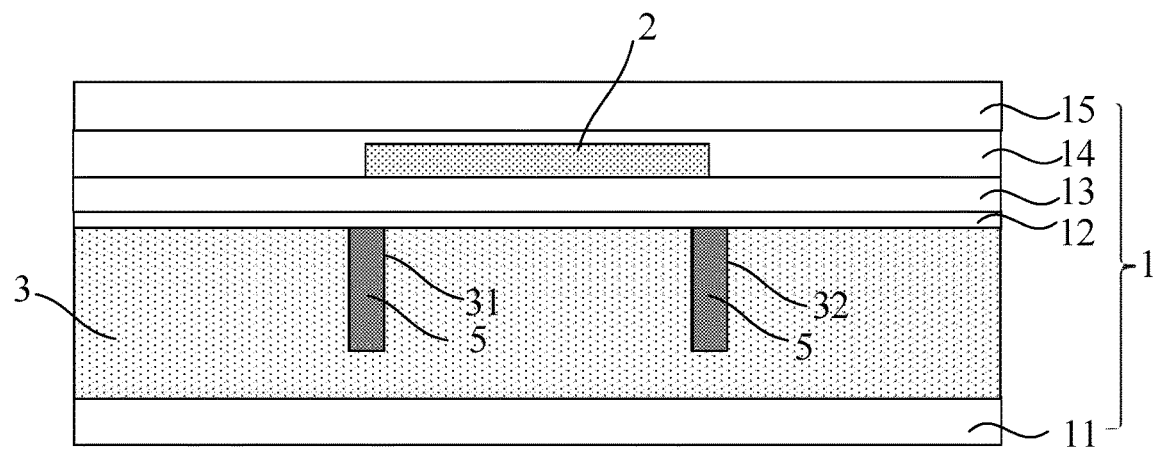
FIG. 4 is another cross-sectional view along A-A' in the antenna of FIG. 1.

In some examples, FIG. 4 is another cross-sectional view along A-A' in the antenna of FIG. 1; as shown in FIG. 4, when the first dielectric layer 1 is a composite film layer, it includes a first sub-dielectric layer 11, a first adhesive layer 12, a second sub-dielectric layer 13, a second adhesive layer 14 and a third sub-dielectric layer 15 which are stacked sequentially; herein, the ground plane 33 is arranged on the side of the first sub-dielectric layer 11 close to the first adhesive layer 12, that is, the side of the first sub-dielectric layer 11 close to the first adhesive layer 12 is used as the second surface of the dielectric layer 1; the radiation patch 22 is arranged on the side of the second sub-dielectric layer 13 close to the second adhesive layer 14, that is, the side of the second sub-dielectric layer 13 close to the second adhesive layer 14 is used as the first surface of the dielectric layer 1. In this case, the feedline 4, the radiation patch 2, and the ground plane 3 are not exposed to the outside, so that water and oxygen erosion can be effectively prevented.

In some examples, when the first dielectric layer 1 includes a first sub-dielectric layer 11, a first adhesive layer 12, a second sub-dielectric layer 13, a second adhesive layer 14, and a third sub-dielectric layer 15 which are stacked sequentially, the first sub-dielectric layer 11 and the third sub-dielectric layer 15 may be of the same material and have the same or substantially the same thickness. The material and thickness of the second sub-dielectric layer 13 are different from that of the first sub-dielectric layer 11 (the third sub-dielectric layer 15), and the thickness of the second sub-dielectric layer 13 is greater than that of the first sub-dielectric layer 11. The thickness of the first sub-dielectric layer 11 (the third sub-dielectric layer 15) is about 10 um to 80 um, and the thickness of the second sub-dielectric layer 13 is about 0.2 mm to 0.7 mm.

The structure of the antenna of the embodiment of the present disclosure will be described below in connection with specific examples.

In a first example, as shown in FIGS. 1 and 2, the antenna includes a first dielectric layer 1, a radiation patch 2, a feedline 4 and a ground plane 3. The first dielectric layer 1 includes a first surface (upper surface) and a second surface (lower surface) arranged opposite each other in a thickness direction thereof. The radiation patch 2 and the ground plane 3 in the antenna are both shaped as plate electrodes. In the embodiment of the present disclosure, the contours of the radiation patch 2 and the ground plane 3 may be of the same shape or may be different. In FIG. 1, it is illustrated only by taking a case in which the contour of the radiation patch 2 is a square and the contour of the ground plane 3 is a rectangle as an example. In practical applications, the shapes of the radiation patch 2 and the ground plane 3 include, but are not limited to, rectangle, ellipse, circle, etc. Continuing with reference to FIG. 1, the radiation patch 2 has a first radiation edge 201 and a second radiation edge 202 extending in a first direction and arranged side by side in a second direction; and a third radiation edge 203 and a fourth radiation edge 204 extending in the second direction and arranged side by side in the first direction. A feedline 4 is connected at a top corner position of the radiation patch 2 to provide a microwave signal to the radiation patch 2. The ground plane 3 has two inner recesses (i.e., two blind grooves formed in the ground plane 3) extending in the first direction and arranged side by side in the second direction, a first inner recess 31 and a second inner recess 32, respectively, and a filling medium 5 is filled in the first inner recess 31 and the second inner recess 32. That is, the length direction of both the first inner recess 31 and the second inner recess 32 is the first direction, the width direction thereof is the second direction, and the depth direction thereof is the thickness direction of the ground plane 3. The orthographic projection of the first radiation edge 201 of the radiation patch 2 on the first dielectric layer 1 penetrates the orthographic projection of the first inner recess 31 on the first dielectric layer 1; the orthographic projection of the second radiation edge 202 of the radiation patch 2 on the first dielectric layer 1 penetrates the orthographic projection of the second inner recess 32 on the first dielectric layer 1. By providing the first inner recess 31 and the second inner recess 32 in the ground plane 3, the profile height of the antenna is reduced to improve the radiation efficiency.

It should be noted that in the embodiment of the present disclosure, the first direction and the second direction, for example, the first direction and the second direction are perpendicular to each other, wherein the first direction is the vertical direction and the second direction is the horizontal direction. In the embodiment of the present disclosure, the description is made by taking a case in which the first direction is a vertical direction and the second direction is a horizontal direction as an example. In FIG. 2, the illustration is made by taking a case in which the first inner recess 31 and the second inner recess 32 are provided in the ground plane 3 as an example. In fact, a third inner recess 33 and a fourth inner recess 34, which extend in the second direction and are arranged side by side in the first direction, may also be provided in the ground plane 3. The orthographic projection of the third radiant edge 203 of the radiation patch 2 on the first dielectric layer 1 penetrates the orthographic projection of the third inner recess 33 on the first dielectric layer 1, and the orthographic projection of the fourth radiant edge 204 of the radiation patch 2 on the first dielectric layer 1 penetrates the orthographic projection of the fourth inner recess 34 on the dielectric layer. Of course, only one or any more of the first inner recess 31, the second inner recess 32, the third inner recess 33 and the fourth inner recess 34 may be arranged in the ground plane 3 of the embodiment of the present disclosure.

In some examples, the length of the first inner recess 31 is not less than the length of the first radiation edge 201 and is not less than one-half of the wavelength divided by the refractive index of the filling material; and/or the length of the second inner recess 32 is not less than the length of the second radiation edge 202 and not less than one-half of the vacuum wavelength divided by the refractive index of the filling material. For example, the length of the first inner recess 31 is not less than the length of the first radiation edge 201 while the length of the second inner recess 32 is not less than the length of the second radiation edge 202. When the ground plane 3 is further provided with the third inner recess 33 and the fourth inner recess 34, the length of the third inner recess 33 is not less than the length of the third radiation edge 203, and/or the length of the fourth inner recess 34 is not less than the length of the fourth radiation edge 204. With this setup, the radiation efficiency of radio frequency signals is effectively improved.

In some examples, the depth of the first inner recess 31 and the second inner recess 32 is equal to or approximately equal to ¼ of the equivalent wavelength. The equivalent wavelength is equal to or approximately equal to the vacuum wavelength divided by the material refractive index of the filling medium 5.

In some examples, if the thickness of the first dielectric layer 1 is h, the width of the first inner recess 31 (second inner recess 32) of the ground plane 3 is more than 5 h (the representation in FIG. 2 is only schematic and does not represent the actual dimensions of each film layer and structure), for example, the width of the first inner recess 31 (second inner recess 32) of the ground plane 3 is 5 h-10 h. The first inner recess 31 and the second inner recess 32 each include a first side edge and a second side edge extending in the second direction and arranged side by side in the first direction; the distance between the orthographic projection of the first radiation edge 201 on the first dielectric layer 1 and the orthographic projection of the first side edge of the first inner recess 31 on the first dielectric layer 1 is a, and the distance between the orthographic projection of the second radiation edge 202 on the first dielectric layer 1 and the orthographic projection of the first side edge of the second inner recess 32 on the first dielectric layer 1 is b. The specific values for a and b need to be obtained by simulation and optimization based on the radiation frequency and the height of the first dielectric layer 1. The thickness of both the radiation patch 2 and the ground plane 3 is about 3 skin depths.

In one example, taking the 10 mm band (30 GHz) as an example, the first dielectric layer 1 has a thickness of 20 μm and a dielectric constant of 3; the thickness of the radiation patch 2 and the ground plane 3 is 3 μm; the width of both the first inner recess 31 and the second inner recess 32 is 200 μm. The depth of the first inner recess 31 and the second inner recess 32 is 800 μm, and the filling medium 5 is a material with a dielectric constant of 10 (for example, silicon or aluminum oxide). The first radiation edge 201 and the second radiation edge 202 are 3.4 μm, the third radiation edge 203 and the fourth radiation edge 204 are 3 μm, and the first inner recess 31 and the second inner recess 32 are provided corresponding to the first radiation edge 201 and the second radiation edge 202, respectively. At this time, the antenna provided with the first inner recess 31 and the second inner recess 32 can obtain a radiation efficiency of 50% at a frequency of 30 GHz, and the antenna provided without the first inner recess 31 and the second inner recess 32 in the ground plane 3 can obtain a radiation efficiency of 8.7% at a frequency of 30 GHz, which is nearly six times higher than the radiation frequency of the antenna provided without the inner recess in the ground plane 3.

Figure 5:
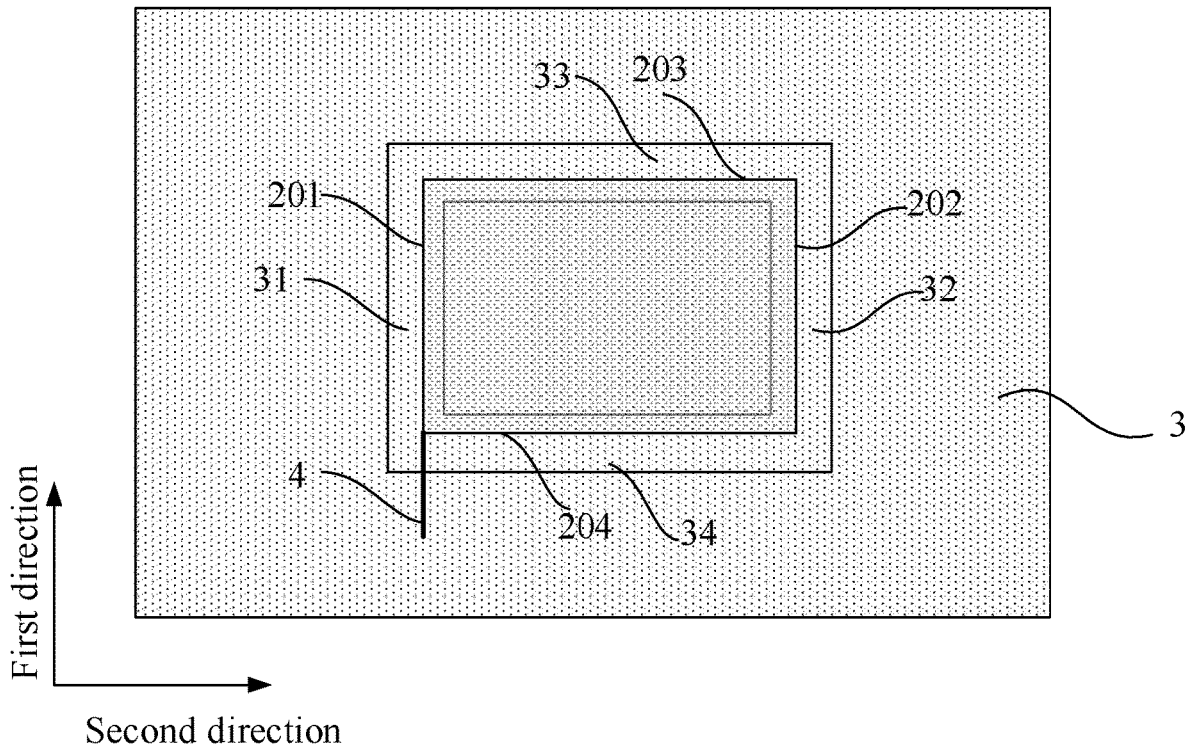
FIG. 5 is a schematic diagram of a structure of another antenna according to an embodiment of the present disclosure.

As a second example, FIG. 5 is a schematic diagram of a structure of another antenna according to an embodiment of the present disclosure; as shown in FIG. 5, the structure of the antenna is substantially the same as that of the antenna in the first example, except that the ground plane 3 in the structure of the antenna not only has the first inner recess 31 and the second inner recess 32, but also includes the third inner recess 33 and the fourth inner recess 34. As shown in FIG. 5, the first inner recess 31, the second inner recess 32, the third inner recess 33 and the fourth inner recess 34 are sequentially connected end to end to form a closed-loop inner recess. The orthographic projection of the radiation edge of the radiation patch 2 on the first dielectric layer 1 is located in the orthographic projection of the inner recess of the ground plane 3 on the first dielectric layer 1. That is, the orthographic projection of the first radiant edge 201 of the radiation patch 2 on the first dielectric layer 1 is within the orthographic projection of the first inner recess 31 of the ground plane 3 on the first dielectric layer 1, the orthographic projection of the second radiant edge 202 of the radiation patch 2 on the first dielectric layer 1 is within the orthographic projection of the second inner recess 32 of the ground plane 3 on the first dielectric layer 1, the orthographic projection of the third radiant edge 203 of the radiation patch 2 on the first dielectric layer 1 is within the orthographic projection of the third inner recess 33 of the ground plane 3 on the first dielectric layer 1, and the orthographic projection of the fourth radiant edge 204 of the radiation patch 2 on the first dielectric layer 1 is within the orthographic projection of the fourth inner recess 34 of the ground plane 3 on the first dielectric layer 1. That is, the ground plane 3 not only has the first inner recess 31 and the second inner recess 32 extending in the first direction, but also includes the third inner recess 33 and the fourth inner recess 34 extending in the second direction, at this time, the microwave signal radiated or received by the structure of the antenna can be polarized not only in the first direction but also in the second direction, whereby the radiation efficiency of the microwave signal can be improved. In this case, if the lengths of the first radiation edge 201 and the second radiation edge 202 of the radiation patch 2 are both L1, the lengths of the third radiation edge 203 and the fourth radiation edge 204 are both L2, the widths of the first inner recess 31 and the second inner recess 32 of the ground plane 3 are all W1, and the widths of the third inner recess 33 and the fourth inner recess 34 are all W2. At this time, the values of L1, L2, W1 and W2 can be reasonably designed, and the working bands corresponding to the first directional polarization and the second directional polarization can be designed respectively according to the values of L1, L2, W1 and W2. The dual-polarized feeding mode of the antenna can be realized by connecting the feedline 4 on the first radiation edge 201 and the third radiation edge 203 of the radiation patch 2, respectively, or connecting the feedline 4 on the second radiation edge 202 and the fourth radiation edge and 204, respectively. Moreover, in FIG. 5, only one top corner position of the radiation patch 2 is given to connect the feedline 4 and achieve microwave signal transmission and reception. It should be noted that the feeding mode shown in FIG. 5 does not constitute a limitation on the scope of protection of embodiments of the present disclosure.

Figure 6:
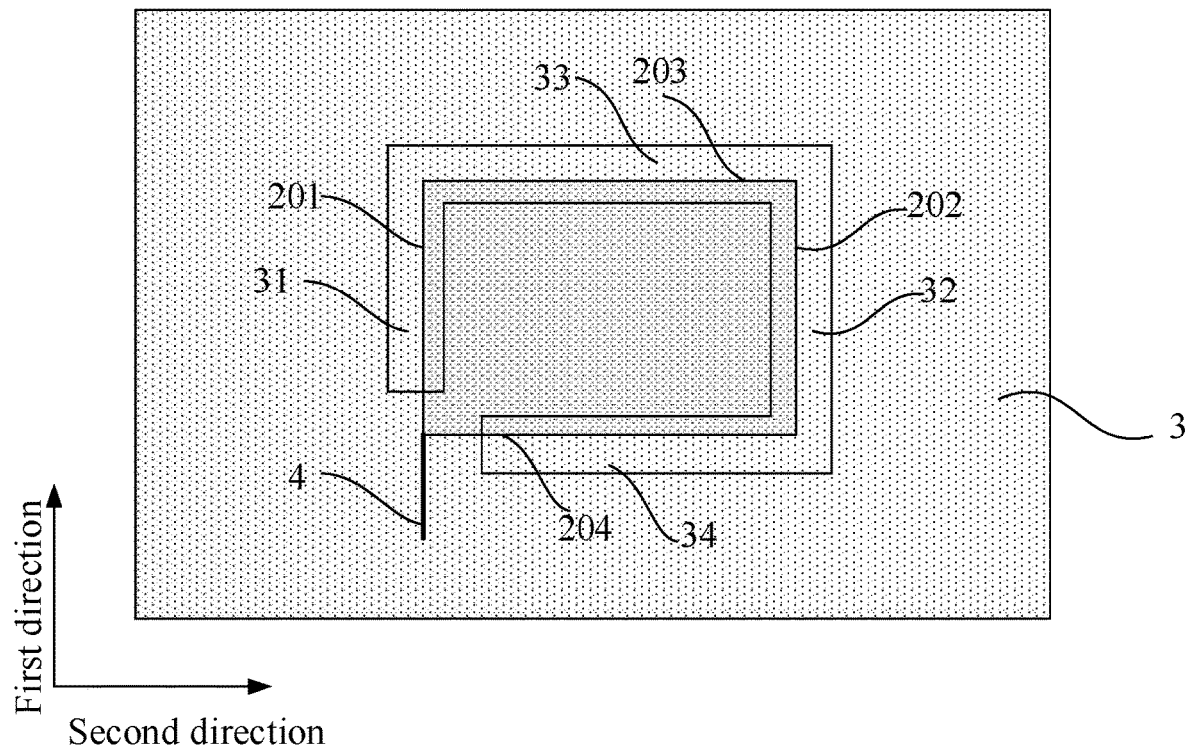
FIG. 6 is a schematic diagram of a structure of another antenna according to an embodiment of the present disclosure.

In some examples, as shown in FIG. 6, the first inner recess 31, the second inner recess 32, the third inner recess 33, and the fourth inner recess 34 in the ground plane 3 are sequentially connected to form an open-loop inner recess. That is, the open-loop inner recess on the ground plane 3 has a disconnect portion, and at this time, the orthographic projection of the feedline 4 on the first dielectric layer 1 penetrates the orthographic projection of the disconnect portion of the open-loop inner recess on the ground plane 3 on the first dielectric layer 1. The reason for this arrangement is that the feedline 4 can better feed the radiation patch 2.

It should be noted that, except for the above-mentioned differences in structure, the structure of this antenna is the same as that of the antenna in the first example. Therefore, it is not repeated here.

Figure 7:
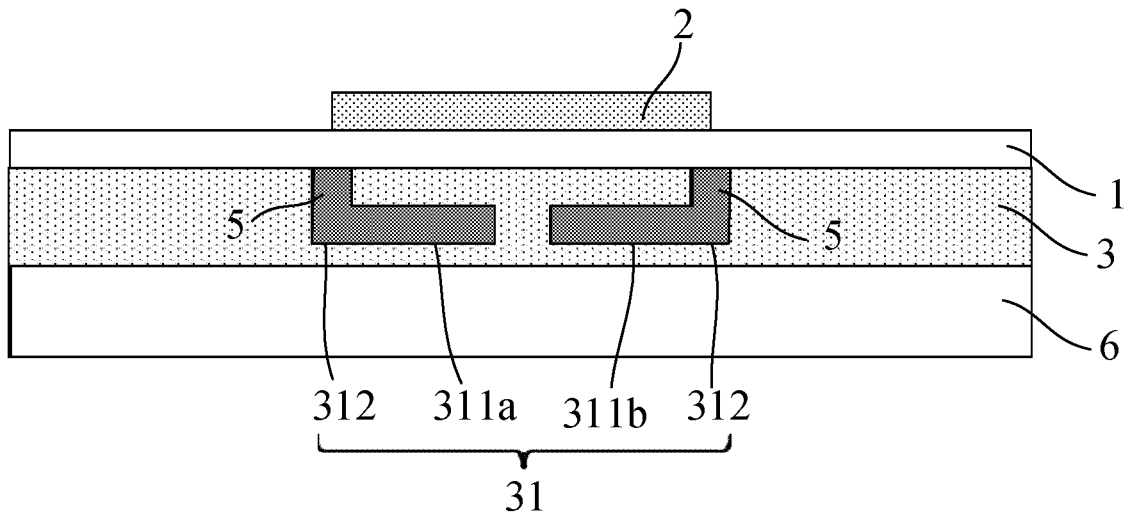
FIG. 7 is a schematic diagram of a structure of another antenna according to an embodiment of the present disclosure.

As a third example, FIG. 7 is a schematic diagram of a structure of another antenna according to an embodiment of the present disclosure; as shown in FIG. 7, the structure of the antenna is approximately similar to that of the first example and the second example except for the shape of the inner recess of the ground plane 3. As shown in FIG. 7, also taking a case in which the radiation patch 2 and the ground plane 3 are square as an example, the radiation patch 2 includes a first radiation edge 201 and a second radiation edge 202 extending in the first direction and arranged side by side in the second direction, and a third radiation edge 203 and a fourth radiation edge 204 extending in the second direction and arranged side by side in the first direction. The inner recess on the ground plane 3 includes a first inner recess 31 and a second inner recess 32. The first inner recess 31 includes a first main body part 311 and a first branch part 312; the second inner recess 32 includes a second main body part and a second branch part. The first main body part 311 is communicated with the first branch part 312, the depth direction of the first main body part 311 extends in the first direction, the depth direction of the first branch part 312 is the thickness direction of the ground plane 3, the opening of the first branch part 312 is the opening of the first inner recess 31, and the orthographic projection of the first radiation edge 201 on the first dielectric layer 1 is within the orthographic projection of the first main body part 311 on the first dielectric layer 1. Similarly, the second main body part is communicated with the second branch part, the depth direction of the second main body part is extended in the first direction, the depth direction of the second branch part is the thickness direction of the ground plane 3, the opening of the second branch part is the opening of the second inner recess 32, and the orthographic projection of the second radiation edge 202 on the first dielectric layer 1 is within the orthographic projection of the second main body part on the first dielectric layer 1.

In one example, the first inner recess 31 includes two first branch parts 312, and the first main body part 311 includes two first sub-main body parts denoted by 311a and 311b respectively; herein, the two first branch parts 311a and 311b are arranged side by side in the first direction, the depth directions of the two first sub-main body parts 311a and 311b are both in the first direction, and both are arranged side by side in the first direction, and the orthographic projection of the first radiation edge 201 of the radiation patch 2 on the first dielectric layer 1 is within the orthographic projection of the two first sub-main body parts 311a and 311b on the first dielectric layer 1. Likewise, the second inner recess 32 includes two second branch parts and the second main body part includes two second sub-main body parts; the two second branch parts are arranged side by side in the first direction, the depth directions of the two second sub-main body parts are both in the first direction and both are arranged side by side in the first direction, and the orthographic projection of the second radiation edge 202 of the radiation patch 2 on the first dielectric layer 1 is located within the orthographic projection of the two second sub-main body parts on the first dielectric layer 1.

Figure 8:
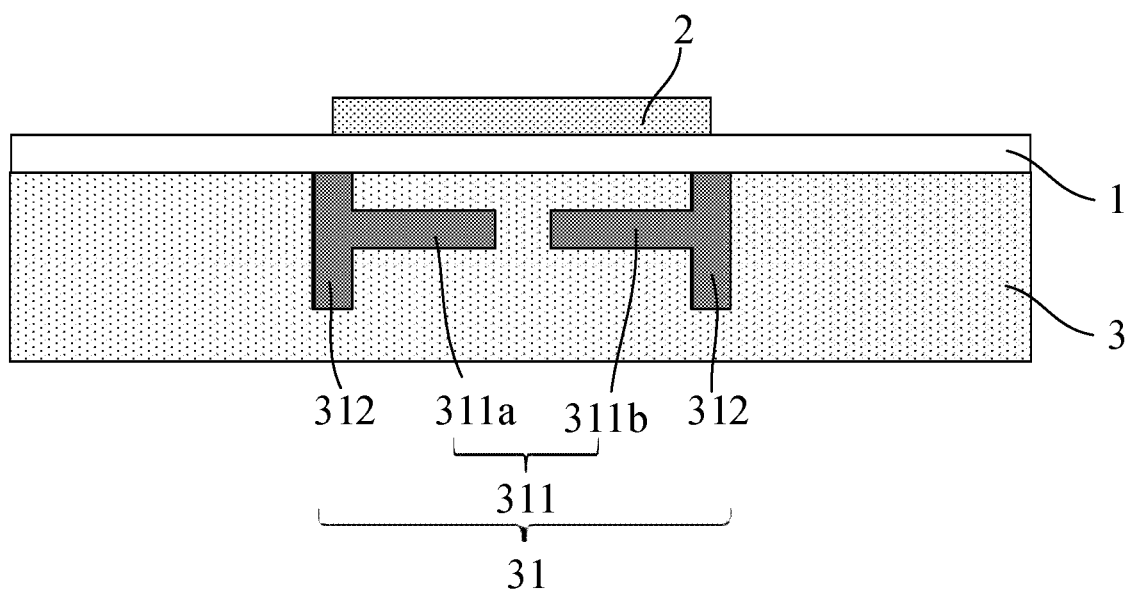
FIG. 8 is a schematic diagram of a structure of another antenna according to an embodiment of the present disclosure.

Further, as shown in FIG. 7 the first sub-main body part 311a may be connected to the bottom of one first branch part 312 and the first sub-main body part 311b may be connected to the bottom of the other first branch part 312. At this time, if the thickness of the ground plane 3 is relatively thin, the second dielectric layer 6 may be arranged on the side of the ground plane 3 departing from the first dielectric layer 1 to provide support for the ground plane 3. Of course, as shown in FIG. 8, if the ground plane 3 is thick and the depths of the first inner recess 31 and the second inner recess 32 are sufficiently deep, the first sub-main body part 311a may be connected to the intermediate region of one first branch part 312, and the first sub-main body part 311b may be connected to the intermediate region of the other first branch part 312. Similarly, the second sub-main body part may be connected to the bottom of the second branch part or to the intermediate region of the second branch part in the depth direction.

In some examples, the depth of the first inner recess 31 is also the sum of the depth of the first branch part 312 and the depth of the first main body 311, and the depth of the second inner recess 32 is also the sum of the depth of the second branch part and the depth of the second main body. The depth of the first inner recess 31 and the depth of the second inner recess 32 are both equal to or approximately equal to ¼ equivalent wavelength. The equivalent wavelength is the vacuum wavelength divided by the refractive index of the material of the filling medium 5.

It should be noted that the above-mentioned description is made only by taking a case in which the first inner recess 31 and the second inner recess 32 are provided at the positions of the ground plane 3 corresponding to the first radiant edge 201 and the second radiant edge 202 of the radiation patch 2 as an example. In actual products, the third inner recess 33 and the fourth inner recess 34 may be provided at the positions corresponding to the third radiant edge 203 and the fourth radiant edge 204. The third inner recess 33 and the fourth inner recess 34 have the same shape as the first inner recess 31 and the second inner recess 32, which will not be repeated here.

Figure 9:
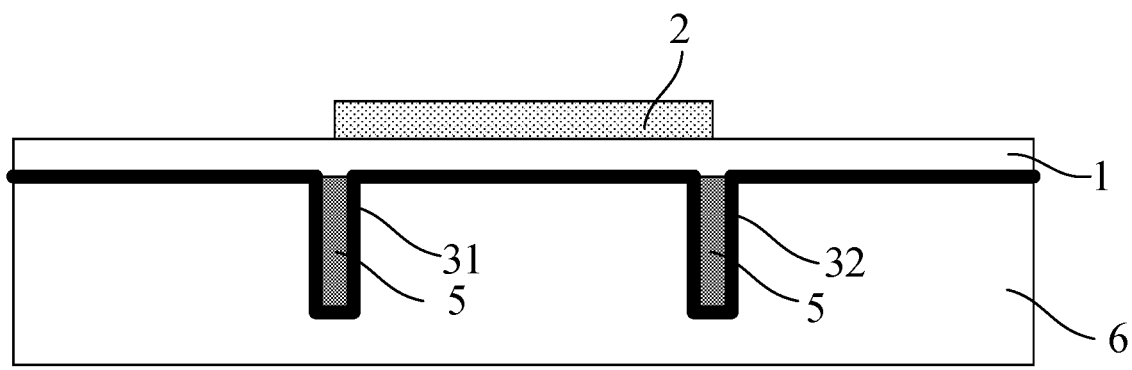
FIG. 9 is a schematic diagram of a structure of another antenna according to an embodiment of the present disclosure.

As a fourth example, FIG. 9 is a schematic diagram of a structure of another antenna according to an embodiment of the present disclosure; as shown in FIG. 9, the structure of the antenna includes a first dielectric layer 1, a second dielectric layer 6, a ground plane 3 and a radiation patch 2. A blind groove is formed on the second dielectric layer 6, the ground plane 3 is formed on the second dielectric layer 6, and an inner recess of the ground plane 3 is defined by the blind groove. The inner recess is filled with the filling medium 5, the first dielectric layer 1 is arranged on the surface of the ground plane 3 departing from the second dielectric layer 6, and the radiation patch 2 is arranged on the surface of the first dielectric layer 1 departing from the ground plane 3. The radiation patch 2 at least partially overlaps with the orthogonal projection of the ground plane 3 on the first dielectric layer 1, and the orthogonal projection of at least part of the radiation edge of the radiation patch 2 on the first dielectric layer 1 is located within the orthogonal projection of the inner recess on the first dielectric layer 1. Radiation efficiency can also be improved by forming a blind groove in the second dielectric layer 6 and defining an inner recess in the ground plane 3 by the blind groove.

For example, the radiation patch 2 and the ground plane 3 are both rectangular, and the radiation patch 2 includes a first radiation edge 201 and a second radiation edge 202 extending in the first direction and arranged side by side in the second direction, and a third radiation edge 203 and a fourth radiation edge 204 extending in the second direction and arranged side by side in the first direction. The second dielectric layer 6 includes a first blind groove and a second blind groove extending in the first direction and arranged side by side in the second direction, and correspondingly, the ground plane 3 includes a first inner recess 31 and a second inner recess 32 extending in the first direction and arranged side by side in the second direction. At this time, the orthographic projection of the first radiation edge 201 on the first dielectric layer 1 is within the orthographic projection of the first inner recess 31 on the first dielectric layer 1, and the orthographic projection of the second radiation edge 202 on the second dielectric layer 6 is within the orthographic projection of the second inner recess 32 on the first dielectric layer 1.

In some examples, the first blind groove and the second blind groove are rectangular or trapezoidal in cross section in the second direction, for example, the bottom angle of the first blind groove and the second blind groove is about 80°~100°. For example, when the first blind groove and the second blind groove are rectangular in cross section in the second direction, the bottom angle of the first blind groove and the second blind groove is 90°, when the first blind groove and the second blind groove is inverted trapezoidal in cross section in the second direction, the bottom angle of the first blind groove and the second blind groove is 100° (as shown in FIG. 10), and when the first blind groove and the second blind groove is trapezoidal in cross section in the second direction, the bottom angle of the first blind groove and the second blind groove is 80°.

Figure 10:
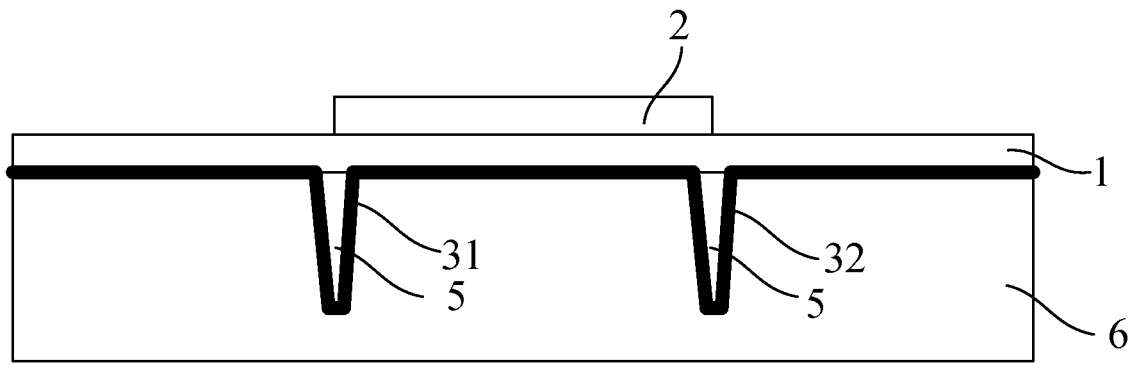
FIG. 10 is a schematic diagram of a structure of another antenna according to an embodiment of the present disclosure.

It should be noted that in FIGS. 9 and 10, the first blind groove and the second blind groove are formed on the second dielectric layer 6, and the first inner recess 31 and the second inner recess 32 are correspondingly arranged on the ground plane 3 as an example. In fact, the third blind groove and the fourth blind groove extending in the second direction and arranged side by side in the first direction are arranged on the second dielectric layer 6, that is, the third inner recess 33 and the fourth inner recess 34 extending in the second direction and arranged side by side in the first direction are arranged on the ground plane 3. The orthographic projection of the third radiant edge 203 of the radiation patch 2 on the first dielectric layer 1 penetrates the orthographic projection of the third inner recess 33 on the first dielectric layer 1, and the orthographic projection of the fourth radiant edge 204 of the radiation patch 2 on the first dielectric layer 1 penetrates the orthographic projection of the fourth inner recess 34 on the dielectric layer. Of course, the second dielectric layer 6 of the embodiment of the present disclosure has only one or any more of the first blind groove, the second blind groove, the third blind groove and the fourth blind groove.

Figure 11:
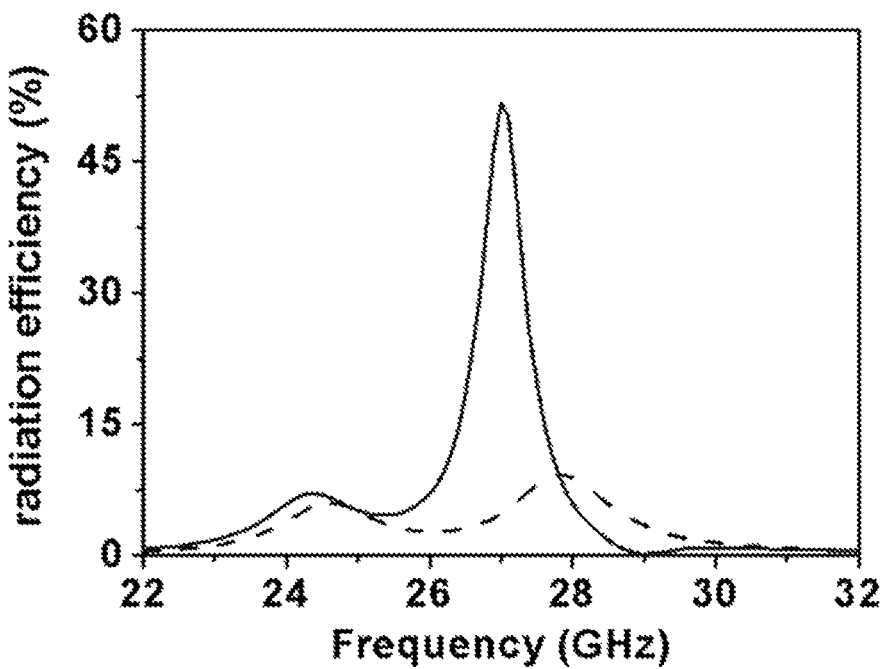
FIG. 11 is a simulation schematic diagram of the antenna shown in FIG. 9.

FIG. 11 is a simulation schematic diagram of the antenna shown in FIG. 9; as shown in FIG. 11, the second dielectric layer 6 has a dielectric constant of 3 and a thickness of 20 μm; the first blind groove and the second blind groove have a width of 200 μm and a depth of 960 μm; the thickness of the ground plane 3 is 5 μm, and the dielectric constant of filling medium 5 is 10. After verification, the maximum radiation efficiency is increased from 8.7% to over 50% in the frequency band from 27 GHz to 28 GHz.

Figure 12:
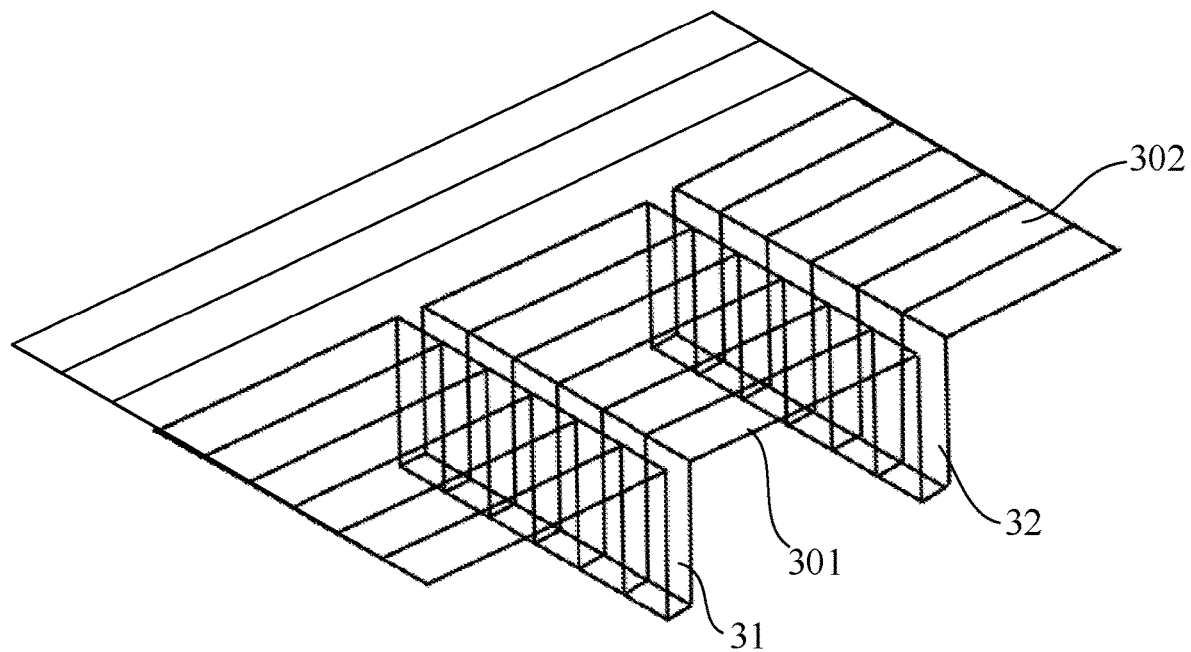
FIG. 12 is a schematic diagram of a ground plane in the structure of another antenna according to an embodiment of the present disclosure.
Figure 13:
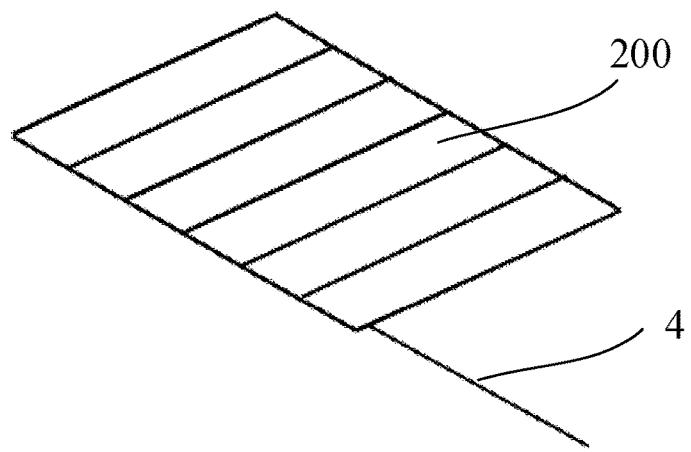
FIG. 13 is a schematic diagram of a radiation patch of another antenna according to an embodiment of the present disclosure.

As a fifth example, FIG. 12 is a schematic diagram of a ground plane 3 in the structure of another antenna according to an embodiment of the present disclosure; FIG. 13 is a schematic diagram of a radiation patch 2 of another antenna according to an embodiment of the present disclosure; as shown in FIGS. 12 and 13, the structure of the antenna is substantially the same as the structure of the antenna in the fourth example, differing only in that both the radiation patch 2 and the ground plane 3 in the antenna have a metal grid structure. The radiation patch 2 and ground plane 3 with metal grid structure can effectively improve the light transmittance of the antenna and improve the radiation efficiency.

For example, the second dielectric layer 6 has an intermediate region and a peripheral region surrounding the intermediate region; the first blind groove and the second blind groove penetrate at least part of a boundary line between the intermediate region and the peripheral region; the orthographic projection of the radiation patch 2 on the first dielectric layer 1 covers the orthographic projection of the intermediate region of the ground plane 3 on the first dielectric layer 1; the ground plane 3 includes a first hollow pattern 301 located in the intermediate region and a second hollow pattern 302 located in the peripheral region; the radiation patch 2 includes a third hollow pattern 200. The orthographic projections of the hollow portion of the first hollow pattern 301 and the hollow portion of the third hollow pattern 200 on the first dielectric layer 1 completely coincide, so that the light transmittance of the structure of the antenna can be effectively improved in this way.

For example, the first hollow pattern 301 includes a plurality of first metal wires extending in the second direction and arranged side by side in the first direction, and a gap between the first metal wires arranged adjacent to each other defines the hollow portion of the first hollow pattern 301. The second hollow pattern 302 includes a plurality of second metal wires extending in the second direction and arranged side by side in the first direction, and a gap between the second metal wires arranged adjacent to each other defines the hollow portion of the second hollow pattern 302. The third hollow pattern 200 includes a plurality of third metal wires extending in the second direction and arranged side by side in the first direction, and a gap between the third metal wires arranged adjacent to each other defines the hollow portion of the third hollow pattern 200. Since the orthographic projections of the hollow portion of the first hollow pattern 301 and the hollow portion of the third hollow pattern 200 on the dielectric layer overlap, at this time, the orthographic projections of a first metal wire and a third metal wire on the first dielectric layer 1 overlap, for example, the first metal wire and the third metal wire are arranged in one-to-one correspondence.

With continued reference to FIG. 13, due to the arrangement of the first inner recess 31 and the second inner recess 32 in the ground plane 3 and the arrangement of the first hollow pattern 301 in the intermediate region of the ground plane 3, a portion of the second metal wire of the peripheral region includes a first wire segment distributed on the side of the first inner recess 31 away from the intermediate region and a second wire segment on the side of the second inner recess 32 away from the intermediate region. An extension line of a metal wire overlaps the orthographic projection of the first wire segment and the second wire segment of the second metal wire on the first dielectric layer 1. In this case, the first hollow pattern 301 and the second hollow pattern 302 on the first dielectric layer 1 can be formed by a single patterning process, and the transmittance of each position of the ground plane 3 constituted by the first hollow pattern 301 and the second hollow pattern 302 is the same, thereby ensuring the optical uniformity of the thin film antenna. In addition, since the extension directions of the first metal wire, the second metal wire and the third metal wire are the same in the embodiment of the present disclosure, the transmitted microwave or millimeter wave energy is maximally scattered into the free space through the first inner recess 31 and the second inner recess 32.

It should be noted that in FIGS. 12 and 13, the description is made by taking a case in which the extension directions of the first metal wire, the second metal wire, and the third metal wire are all the same as an example. However, in actual design, it is sufficient as long as the extension directions of the first metal wire, the second metal wire, and the third metal wire are all different from the extension directions of the first inner recess 31 and the second inner recess 32. Therefore, the extension directions of the first metal wire, the second metal wire and the third metal wire are all in the second direction does not form a limitation on the protection scope of the embodiment of the present disclosure.

Figure 14:
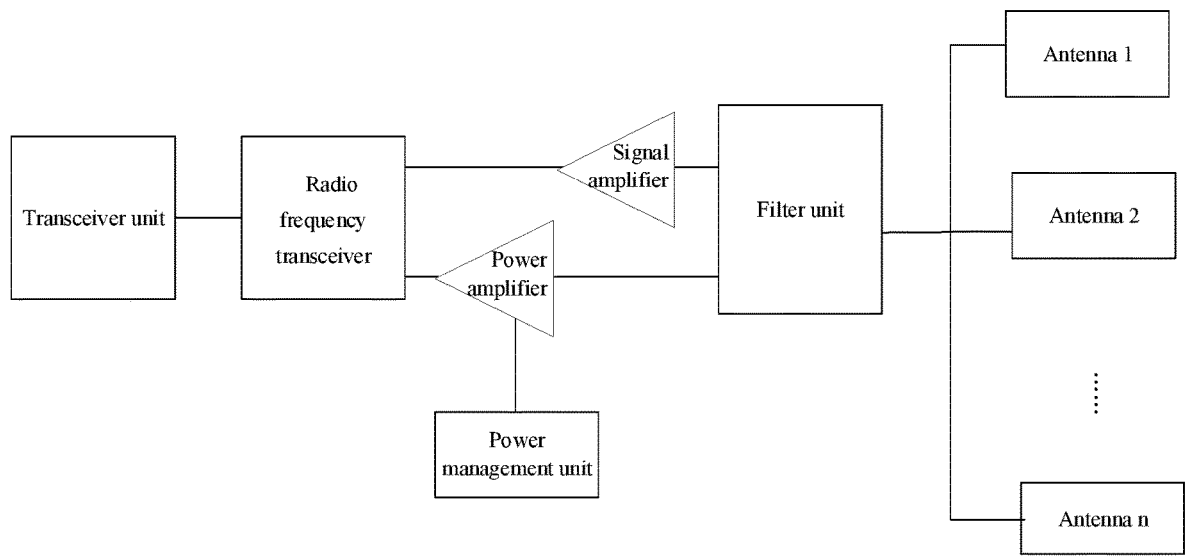
FIG. 14 is a schematic diagram of a structure of an antenna system according to an embodiment of the present disclosure.

In a second aspect, FIG. 14 is a schematic diagram of a structure of an antenna system according to an embodiment of the present disclosure; as shown in FIG. 14, an embodiment of the present disclosure provides an antenna system including at least one above-mentioned antennas.

In some examples, the antenna system provided by embodiments of the present disclosure further includes a transceiver unit, a radio frequency transceiver, a signal amplifier, a power amplifier and a filter unit. The antenna in the antenna system can be used as a transmitting antenna or a receiving antenna. The transceiver unit may include a baseband and a receiving end, wherein the baseband provides signals in at least one frequency band, such as providing 2G signals, 3G signals, 4G signals, 5G signals, etc., and transmits the signals in at least one frequency band to the radio frequency transceiver. After the signal is received by the antenna in the antenna system, it can be processed by the filter unit, power amplifier, signal amplifier, RF transceiver and then transmitted to the receiving end in the transceiver unit, the receiving end can be, for example, a smart gateway, etc.

Further, the RF transceiver is connected with the transceiver unit for modulating the signal transmitted by the transceiver unit or for demodulating the signal received by the antenna and transmitting it to the transceiver unit. Specifically, the radio frequency transceiver may include a transmitting circuit, a receiving circuit, a modulation circuit, and a demodulation circuit. After the transmitting circuit receives a plurality of types of signals provided by the substrate, the modulation circuit may modulate a plurality of types of signals provided by a baseband and then transmit the signals to the antenna. The antenna receives the signal and transmits it to the receiving circuit of the radio frequency transceiver. The receiving circuit transmits the signal to the demodulation circuit, which demodulates the signal and transmits it to the receiving end.

Further, the radio frequency transceiver is connected with a signal amplifier and a power amplifier, and the signal amplifier and the power amplifier are in turn connected with a filter unit, which is connected with at least one antenna. In the process of transmitting signals from the antenna system, the signal amplifier is used for improving the signal-to-noise ratio of the signal output by the radio frequency transceiver and then transmitting the signal to the filter unit; the power amplifier is used for amplifying the power of the signal output by the radio frequency transceiver and transmitting it to the filter unit; the filter unit can specifically include a diplexer and a filter circuit. The filter unit combines and filters out noise from the signals output by the signal amplifier and power amplifier, and then transmits them to the antenna, and the antenna radiates the signals. In the process of receiving signals by the antenna system, the antenna receives the signals and transmits them to the filter unit, the filter unit filters out noise from the signals received by the antenna and transmits them to the signal amplifier and power amplifier, and the signal amplifier gains the signals received by the antenna to increase the signal-to-noise ratio; the power amplifier amplifies the power of the signal received by the antenna. The signal received by the antenna is transmitted to the radio frequency transceiver after being processed by the power amplifier and the signal amplifier, and then the radio frequency transceiver transmits it to the transceiver unit.

In some examples, the signal amplifier may include various types of signal amplifiers, such as low noise amplifiers, which is not limited herein.

In some examples, the antenna system provided by embodiments of the present disclosure further includes a power management unit, which is connected with the power amplifier to provide the power amplifier with a voltage for amplifying the signal.

It is to be understood that the above embodiments are only exemplary embodiments employed for the purpose of illustrating the principles of the present invention, however the present invention is not limited thereto. To those of ordinary skill in the art, various modifications and improvements may be made without departing from the spirit and substance of the present disclosure, and these modifications and improvements are also considered to be within the scope of the present disclosure.

The invention claimed is:

1. An antenna comprising:
    a first dielectric layer having a first surface and a second surface arranged opposite to each other in a thickness direction of the first dielectric layer;
    a radiation patch, which is arranged on the first surface of the first dielectric layer;
    a first electrode layer, which is arranged on the second surface of the first dielectric layer, and at least partially overlaps with an orthographic projection of the radiation patch on the second surface;
    wherein the first electrode layer has an inner recess, and openings of the inner recess face the radiation patch, and an orthographic projection of at least part of a radiation edge of the radiation patch on the first dielectric layer at least partially overlaps with an orthographic projection of the inner recess on the first surface; a depth of the inner recess is ¼ equivalent wavelength.

2. The antenna according to claim 1, wherein the radiation edge of the radiation patch comprises a first radiation edge and a second radiation edge extending in a first direction and arranged side by side in a second direction; the inner recess comprises a first inner recess and a second inner recess; a length direction of both the first inner recess and the second inner recess is the first direction, a width direction of both the first inner recess and the second inner recess is the second direction, and a depth direction of both the first inner recess and the second inner recess is a thickness direction of the first electrode layer; an orthographic projection of the first radiation edge on the first dielectric layer is located in an orthographic projection of the first inner recess on the first dielectric layer; an orthographic projection of the second radiation edge on the first dielectric layer is located in an orthographic projection of the second inner recess on the first dielectric layer.

3. The antenna according to claim 2, wherein the radiation edge of the radiation patch further comprises a third radiation edge and a fourth radiation edge extending along the second direction and arranged side by side along the first direction; the inner recess further comprises a third inner recess and a fourth inner recess; a length direction of both the third inner recess and the fourth inner recess is the second direction, a width direction of both the third inner recess and the fourth inner recess is the first direction, and a depth direction of both the third inner recess and the fourth inner recess is the thickness direction of the first electrode layer; an orthographic projection of the third radiation edge on the first dielectric layer is located in an orthographic projection of the third inner recess on the first dielectric layer; an orthographic projection of the fourth radiation edge on the first dielectric layer is located in an orthographic projection of the fourth inner recess on the first dielectric layer.

4. The antenna according to claim 3, wherein the first inner recess, the second inner recess, the third inner recess and the fourth inner recess are sequentially connected end to end to form a closed-loop inner recess.

5. The antenna according to claim 3, wherein the first inner recess, the second inner recess, the third inner recess, and the fourth inner recess are sequentially connected to form an open-loop inner recess.

6. The antenna according to claim 5, wherein the antenna further comprises: a feedline arranged on the first surface of the dielectric layer, the feedline is electrically connected with the radiation patch; an orthographic projection of the feedline on the first dielectric layer and an orthographic projection of the open-loop inner recess on the first dielectric layer do not overlap.

7. The antenna according to claim 1, wherein the radiation edge of the radiation patch comprises a first radiation edge and a second radiation edge extending in a first direction and arranged side by side in a second direction; the inner recess comprises a first inner recess and a second inner recess;
    the first inner recess comprises a first main body part and a first branch part, the first main body part and the first branch part communicate with each other, and a depth direction of the first branch part is a thickness direction of the first electrode layer, and a depth direction of the first main body part is the second direction; an orthographic projection of the first radiation edge on the first dielectric layer is located in an orthographic projection of the first main body part on the first dielectric layer;
    the second inner recess comprises a second main body part and a second branch part, the second main body part and the second branch part communicate with each other, and a depth direction of the second branch part is a thickness direction of the first electrode layer, and a depth direction of the second main body part is a second direction; an orthographic projection of the second radiation edge on the first dielectric layer is located in an orthographic projection of the second main body part on the first dielectric layer.

8. The antenna according to claim 7, wherein the first inner recess comprises two of the first branch parts and the first main body part comprises two first sub-main body parts; two of the first branch parts are arranged side by side along the first direction; depth directions of the two first sub-main body parts are both in the first direction, and both are arranged side by side along the first direction, and the orthographic projection of the first radiation edge on the first dielectric layer is located in an orthographic projection of the two first sub-main body parts on the first dielectric layer;

the second inner recess comprises two of the second branch parts, and the second main body part comprises two second sub-main body parts; two of the second branch parts are arranged side by side along the first direction; depth directions of the two second sub-main body parts are both in the first direction, and both are arranged side by side along the first direction; the orthographic projection of the second radiation edge on the first dielectric layer is located in an orthographic projection of the two second sub-main body parts on the first dielectric layer.

9. The antenna according to claim 1, wherein the antenna further comprises:

a second dielectric layer, wherein a blind groove is arranged on the second dielectric layer; the first electrode layer is arranged on the second dielectric layer, and the blind groove defines the inner recess.

10. The antenna according to claim 9, wherein the second dielectric layer has an intermediate region and a peripheral region surrounding the intermediate region; the blind groove penetrates at least part of a boundary line between the intermediate region and the peripheral region; an orthographic projection of the radiation patch on the first surface covers an orthographic projection of an intermediate region of the reference electrode on the first surface;

the first electrode layer comprises a first hollow pattern located in the intermediate region and a second hollow pattern located in the peripheral region; the radiation patch comprises a third hollow pattern.

11. The antenna according to claim 10, wherein orthographic projections of a hollow portion of the first hollow pattern and a hollow portion of the third hollow portion on the first surface completely overlap.

12. The antenna according to claim 9, wherein a bottom angle of the blind groove is between 80° to 100°.

13. The antenna according to claim 1, wherein dielectric material filled in the inner recess comprises any one of silicon, aluminum oxide, and ceramic.

14. An antenna system comprising at least one antenna according to claim 1.

15. The antenna system according to claim 14, further comprising:

a transceiver unit used for transmitting or receiving signals;

a radio frequency transceiver, connected with the transceiver unit, used for modulating a signal sent by the transceiver unit or for demodulating a signal received by the antenna and transmitting the signal to the transceiver unit;

a signal amplifier connected with the radio frequency transceiver and used for improving a signal-to-noise ratio of the signal output by the radio frequency transceiver or the signal received by the antenna;

a power amplifier connected with the radio frequency transceiver and used for amplifying a power of the signal output by the radio frequency transceiver or the signal received by the antenna;

a filter unit, which is connected with the signal amplifier, the power amplifier and the antenna, and is used for filtering and sending the received signal to the antenna, or filtering the signal received by the antenna.

* * * * *